May 22, 1945. F. G. WEISBECKER 2,376,643
YARN GUIDE MEANS
Filed Oct. 18, 1943 3 Sheets-Sheet 1
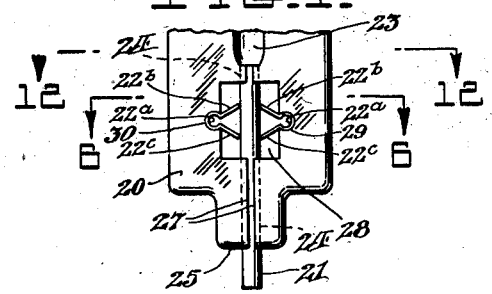
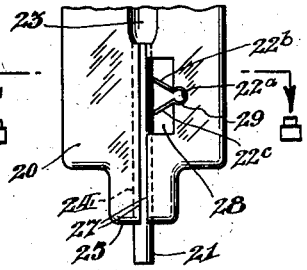
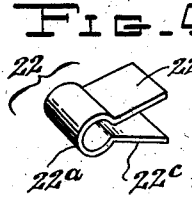
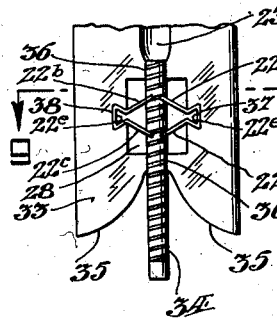
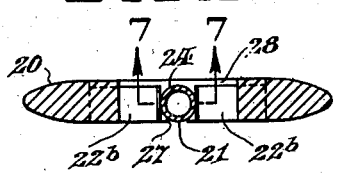
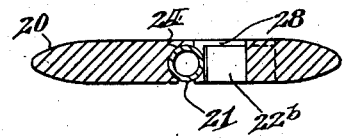
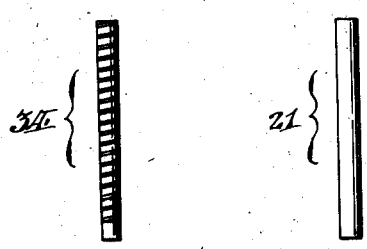
INVENTOR:
Frank G. Weisbecker,
BY
Alfred E. Eschinger
ATTORNEY.

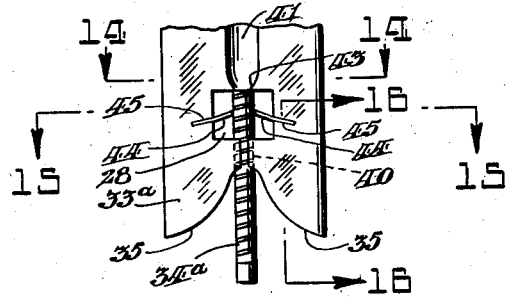
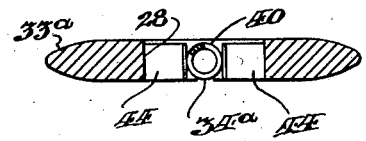
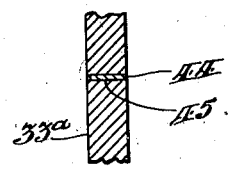
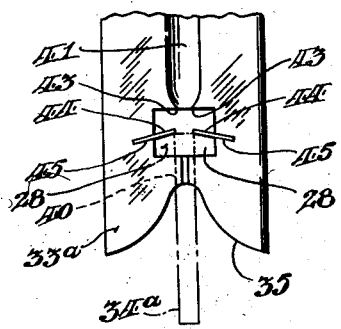
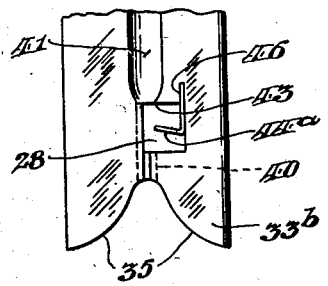

INVENTOR:
Frank G. Weisbecker,
BY
ATTORNEY.

Patented May 22, 1945

2,376,643

UNITED STATES PATENT OFFICE 2,376,643

YARN GUIDE MEANS

Frank G. Weisbecker, Glenside, Pa., assignor to Hosiery Patents Inc., Lansdale, Pa., a corporation of Pennsylvania Application October 18, 1943, Serial No. 506,767

14 Claims. (Cl. 66—126)

This invention relates to devices such as the reciprocable yarn carriers for straight knitting machines, which are provided with means for releasably retaining a small tubular yarn guide element in cooperative association therewith.

Straight or full-fashioned knitting machines are equipped with reciprocable yarn carrier devices or arms provided with various means for releasably holding in determined position the small replaceable yarn guide tubes through which the yarn passes on its way to the knitting elements. In general, there are two distinct classes, or groups, of such means. The purpose and function of the means in one class is to engage or cooperate with an element added to, or embodied in the yarn guide tube, to effect a positive connection which overcomes the tube displacing shocks or action resulting from operation of the machine. Due to the smallness of the tubes, the hardness of the material of which they are constructed and certain dimensional limitations, the addition of the said elements introduces manufacturing costs, as well as structural and functional difficulties, which make the elimination of said elements desirable from a practical and commercial standpoint. The recognition of this fact has heretofore led to the development of a second type of means the purpose and function of which is to engage or cooperate directly with the exterior surfaces of plain yarn guide tubes to effect a frictional, or pressure connection, intended to releasably maintain the replaceable tubes in determined position on the carrier arm. However, attempts to bring about the adoption and commercialization of the various developments in this second group of means have met with comparatively little favor and success, mainly because these developments have not satisfactorily carried out their intended purpose, and otherwise have not been free of certain detrimental structural or functional features.

One object of my invention is to provide novel means of the second type, which can be cooperatively associated with conventional yarn carrier devices, such as a yarn carrier arm for straight knitting machines, to releasably secure a plain yarn guide tube of the indicated character in determined cooperative association therewith, and which means effectively performs its intended purpose and eliminates the detrimental features of the similar prior art means.

Another object is to provide such means which is capable of releasably securing in determined cooperative position on its support, plain yarn guide tubes of rigid or flexible construction.

A further object is to provide such means which comprises one or more releasable tube engaging elements arranged to effect a pressure connection between the tube and its support, the pressure of which is automatically varied by movement of the tube relative to its support.

An additional object is to provide such means which comprises one or more releasable clutch elements arranged to engage the yarn guide tube while being moved longitudinally into seating position on its support, and which elements will permit free movement of the tube in the seating direction but prevent such movement in the tube releasing direction.

It is also an object to provide such means which comprises one or more resilient elements each connected with the support and provided with a substantially straight part which is diagonally arranged relative to the longitudinal axis of the tube and one end of which is movable along the exterior surface of the tube into and out of tensioned engagement therewith.

Another object is to provide such means comprising one or more releasable tube engaging elements having a sharp tube engaging edge, or part.

Another feature resides in the provision of such means comprising one or more releasable tube engaging elements having an arcuate tube engaging part, or tip, adapted to prevent lateral movement of the tube while seated in determined position on its support.

A further object is to provide such means which can be fixedly or removably associated with a yarn guide tube support.

A still further object is to provide a novel yarn carrier for straight or full-fashioned knitting machines which embodies some, or all of the advantageous structural and functional features of the referred to means.

With these and other objects in view, which will become more apparent from the following detailed description of certain practical and illustrative embodiments of my novel improvements, shown in the accompanying drawings, the invention comprises the new elements, features of construction and arrangement of parts in cooperative relationship, as hereinafter more specifically pointed out in the claims.

Referring to the drawings:

Figure 1 is a front elevational view, on an enlarged scale, of the lower end of a conventional yarn carrier of the type associated with full-fashioned knitting machines, having one form of my invention applied thereto.

Fig. 2 is a view similar to Fig. 1, and shows another form of my invention applied to a yarn carrier.

Fig. 3 is a front elevational view, similar to Fig. 1, of a conventional yarn carrier of the type associated with full-fashioned knitting machines having a flexible yarn guide tube releasably held in position by a modified arrangement of my invention.

Fig. 4 is an enlarged perspective view of a novel leaf spring element shown in Figs. 1 and 2, which forms part of my invention.

Fig. 5 is an enlarged perspective view of the leaf spring element shown in Fig. 3.

Fig. 6 is a cross-sectional view, on an enlarged scale, taken substantially as indicated by the arrows 6—6 on Fig. 1.

Fig. 7 is an elevational sectional view, on a greatly enlarged scale, taken substantially as indicated by the arrows 7—7 on Fig. 6.

Figs. 8 and 9 are cross-sectional views taken substantially as indicated by the arrows 8—8 and 9—9 on Figs. 2 and 3, respectively.

Fig. 10 is an elevational view of a plain flexible slightly tapered yarn guide tube such as associated with the yarn carrier of Fig. 3.

Fig. 11 is an elevational view of a plain rigid cylindrical yarn guide tube such as associated with the yarn carriers of Figs. 1 and 2.

Fig. 12 is a cross-sectional view taken substantially as indicated by the arrows 12—12 on Fig. 1.

Fig. 13 is a front elevational view, similar to Fig. 3, and illustrates another form of my invention.

Figs. 14, 15 and 16 are cross-sectional views taken substantially as indicated by the arrows 14—14, 15—15 and 16—16 on Fig. 13.

Fig. 17 is a view similar to Fig. 13, but with the yarn guide tube indicated in dot-and-dash lines in a position of initial contact with the spring elements during its upward movement.

Fig. 18 is a view similar to Fig. 17, but of a modified form of construction.

Fig. 19 is an elevational view of the plain flexible cylindrical yarn guide tube such as associated with the yarn carrier of Fig. 13.

Figure 20:
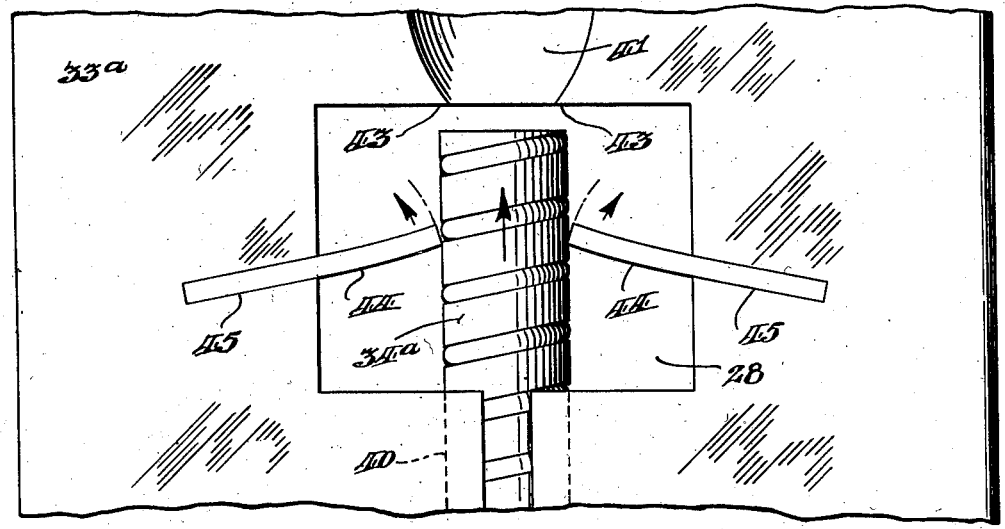
Figure 21:
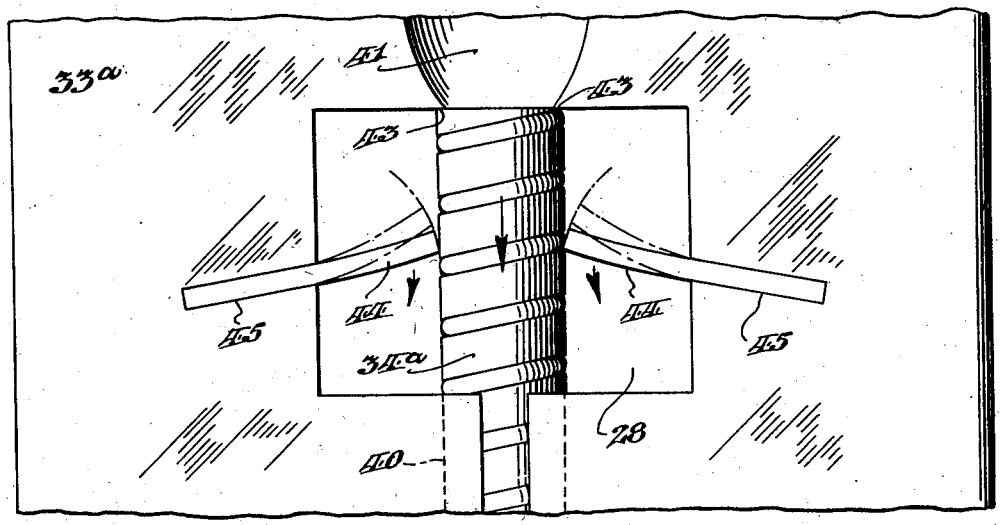

Figs. 20 and 21 are greatly enlarged front elevational views of certain parts of Fig. 13, and more clearly illustrate the action of the spring elements relative to the yarn guide tube.

One practical embodiment of my invention is illustrated by Figs. 1, 4, 6, 7, 11 and 12 of the drawings. This embodiment generally comprises a support in the form of a conventional yarn carrier arm 20 of the type commonly associated with straight or full-fashioned knitting machines, the illustrated lower end of which is modified in accordance with my invention; a plain rigid cylindrical yarn guide tube 21 made of steel, glass, or other material in accordance with the prevailing practice; and two similar substantially V-shaped resilient elements 22.

The upper part of the yarn carrier 20 (not shown) is of the usual and well known construction and arrangement characteristic of such devices, and has been omitted in Fig. 1 and the subsequently referred to similar illustrations, since my invention will carry out its intended purpose irrespective of the common type of construction, or arrangement of the upper part, or parts, of such a yarn carrier arm.

To facilitate an understanding of the changes made in the lower end of carrier arm 20 in accordance with my invention, the conventional or prior art features of the latter will first be briefly pointed out. Following the prior art practice, the yarn carrier arm 20 is tapered longitudinally so that its thinnest portion is at the end adapted to support the yarn guide tube 21. This end of the carrier is also tapered to its opposite side edges, substantially as shown in Fig. 6. The thickness of the carrier end 20 may be substantially the same, or slightly greater along its longitudinal center line, than the external diameter of the tube 21, depending upon the number of yarn carrier arms operating in a given knitting machine section, and consequently the space available to permit the individual carrier arms to freely pass each other during their yarn laying, or feeding operation.

Conventional straight, or full-fashioned knitting machines have as many as seven or nine such yarn carriers operating in closely spaced relationship in each knitting section producing a single flat stocking fabric, or blank, and these carriers travel in closely spaced parallel paths, each of the carriers having a reciprocating movement in a sidewise direction.

To guide the yarn into the upper end of the tube 21, the front face of the carrier arm 20 is usually provided with a yarn guide groove 23.

A bore or guide passage 24 extends along the center line of the carrier arm 20, from the bottom edge 25 to the groove 23, into the bottom end of which the yarn guide tube is initially inserted for guided movement upwardly to its determined seating position, or cooperative association with the yarn carrier arm 20, as shown in Fig. 1. The diameter of the bore 24 is such as to provide a snug but free sliding fit for the yarn guide tube 21. If the central section of the carrier arm 20 is thicker than the diameter of the bore 24, and the bore is located in the middle thereof, the process of forming the bore will not result in a break in the front or rear faces of the carrier arm. Where, however, the bore is located substantially flush with the front face of the carrier 20, as shown in Figs. 1 and 6, to provide a continuous wall section in the carrier at the rear of the bore, the said process will effect a slight separation in the front face, as indicated at 27 in the said two figures.

In accordance with my invention, a yarn carrier arm 20, having the general structural and functional characteristics above pointed out, is provided with the hereinafter indicated means for releasably retaining the plain yarn guide tube 21 in its determined cooperating position on the carrier 20.

As shown in Figs. 1 and 6, the carrier 20 is provided with an aperture or eye 28, intermediate the ends of the bore 24, having opposite side wall indentations, or notches 29 and 30, shaped to receive the similarly shaped central or apex sections 22ª of the two substantially V-shaped resilient elements 22.

The elements 22 are formed of flat spring metal stock, or other suitable resilient material, and are removably mounted in the notches 29 and 30. They are held in position on the carrier 20 by tensioned or expanded frictional binding engagement of their circular part 22ª with the respective similarly shaped walls of the notches 29 and 30. When the tube 21 is not associated with the carrier 20, the two legs 22ᵇ and 22ᶜ of each element 22 can be moved toward each other sufficiently to contract, or reduce the diameter of the circular portion 22ª to a smaller diameter than the diameter of the notches 29 or 30, so as to permit free lateral disengaging movement of the element 22 from the carrier 20.

From Figs. 1 and 7, it will be noted that one end of each leg 22ᵇ and 22ᶜ of the elements 22 is connected with, or anchored on the carrier arm 20 by the integral apex section 22ª, and that each of the legs 22ᵇ and 22ᶜ constitute a straight part of the element 22 which lengthwise, is arranged diagonally relative to the longitudinal axis of the tube 21, so that its free end can be laterally flexed, and its tip moved in the aperture 28, along the exterior surface of the tube, to effect a connecting and disconnecting movement relative to the latter. When the flexed free end of one of the legs 22b or 22c is released, the sharp edge of one corner of its tip will be forced into tensioned engagement with the exterior tube surface. When the spring element 22 is in relaxed condition, as shown in Fig. 4, the legs 22b and 22c are separated by a greater distance than when they are in position on the carrier 20. However, when the legs 22b and 22c of the resilient elements 22 are in the spread tube holding position shown in Fig. 1, they are laterally tensioned in a direction tending to move the legs toward each other, and the sharp edge, or corner of each of the free ends of the legs 22b and 22c is forced into tensioned engagement with the exterior surface of the tube 21, as more particularly shown in Fig. 7. The resultant pressure connection formed by the elements 22, between the tube 21 and the carrier 20, prevents any appreciable longitudinal movement of the tube in its bore 24, in either direction. Any slight longitudinal movement of the tube 21 relative to the carrier 20 in a downward direction (Fig. 1) will bring about a corresponding downward movement of the tips of the legs 22b, since the sharp corners thereof are in firm tensioned engagement with the exterior surface of the tube. Furthermore, such a movement immediately increases the pressure exerted by the sharp corners of the legs 22b against the surface of the tube 21, because this movement correspondingly decreases the distance spanned by the legs 22b between their points of engagement with the tube 21 and carrier 20, and a forced movement of the tube 21 will tend to curve or bend the resilient legs 22b. In similar manner, the sharp corners of the legs 22c will be pressed against the tube 21 with increasing force when the tube is moved longitudinally in an upward direction.

When it is desired to adjust the longitudinal position of the tube 21, or to release it entirely from the carrier 20, the legs 22b and 22c of each element 22, are spread apart, i. e., each of the legs 22b is moved upwardly and each of the legs 22c is moved downwardly, until the sharp corners at the ends thereof are disengaged from the exterior surface of the tube. This can be quickly and easily accomplished by means of a suitable implement or tool (not shown) having a cam-like conical or tapered prong, or prongs, adapted to be inserted between the legs of each element 22, adjacent the tube 21, so that transverse movement thereof in the aperture 28 will effect spreading of the legs 22b and 22c to bring about the indicated disengaging movement. When the sharp corners of the legs 22b and 22c have been disengaged from the tube 21, the latter can be positioned longitudinally, at will, or entirely withdrawn from its bore 24, and another similar tube inserted in its place, if desired.

From the foregoing description it will be evident that the tube 21 is releasably held in any desired longitudinally adjusted position on the carrier arm 20 by the V-shaped spring elements 22, and is prevented from moving upwardly or downwardly when engaged by the latter as shown in Fig. 1.

Figs. 2 and 8 illustrate how the construction just described may be simplified. Since this modified construction involves substantially the same, but fewer parts than the construction already described, similar reference characters are used to designate the corresponding parts so as to avoid repetition of their description. In this arrangement, the aperture 28 is provided at one side of the tube 21, to accommodate a single spring element 22, and the wall of the bore 24, for the tube 21, is consequently continuous along the side opposite to the aperture 28.

Figs. 3, 5, 9 and 10 illustrate another modification of my invention and more particularly show the lower end of a conventional yarn carrier arm 33 adapted to have a flexible yarn guide tube 34 associated therewith. Such carriers are usually provided with a bottom edge or edges 35, which are curved to permit lateral flexing movement of the protruding end of the tube when it strikes an obstruction, such as the upper edge of a sinker (not shown) of the knitting machine. Instead of a bore to provide a seat for the tube 34, the carrier 33 of Figs. 3 and 9, has a substantially semi-circular channel 36 with extended side walls, in its front face. The said channel is of a width to snugly accommodate therein the plain slightly tapered flexible yarn guide tube 34 which may be formed in accordance with the disclosure and practice of my copending U. S. patent application Sr. No. 496,668, or one or more of the following U. S. patents:

| Number | Date | Inventor |
| --- | --- | --- |
| 2,014,341 | Sept. 10, 1935 | F. G. Weisbecker |
| 2,101,801 | Dec. 7, 1937 | F. G. Weisbecker |
| 2,214,712 | Sept. 10, 1940 | F. G. Weisbecker |
| 2,218,976 | Oct. 22, 1940 | F. G. Weisbecker |
| 2,218,977 | Oct. 22, 1940 | A. L. Weisbecker |
| 2,302,727 | Nov. 24, 1942 | A. L. Weisbecker |
| 2,317,318 | Apr. 20, 1943 | F. G. Weisbecker |

To releasably retain the flexible yarn guide tube 34 in determined cooperative position on the carrier arm 33, similar but slightly modified spring elements are mounted on the latter, as before, the previously described parts of which are designated by the same reference characters.

To prevent the flexible yarn guide tube 34 from moving laterally out of the front, or open portion of its seating channel 36, the free ends of the legs 22b and 22c of the spring elements 22, are in this instance provided with arcuate notches 22d of a curvature corresponding substantially with the perimetrical curvature of the yarn guide tube 33, as shown in Fig. 9.

If desired, the spring elements 22 may be provided with an intermediate or apex section 22e of a different configuration than that previously described, as, for example, a section of triangular configuration, such as shown in Figs. 3 and 5. Of course, this necessitates the provision of seating notches 37 and 38, on the carrier 33, of similar configuration.

Figs. 13, 14, 15, 16, 17, 19, 20 and 21 illustrate another form of my invention applied to a conventional yarn carrier arm adapted to have a flexible yarn guide tube cooperatively associated therewith. The parts of this modified construction which substantially correspond with the described parts shown in Figs. 3, 5, 9 and 10, are designated by the same reference characters.

In this form of my invention the carrier arm 33a is provided with a guide bore or passage 40 for a flexible cylindrical tube 34a, which bore performs the same function as the bore 24 in Fig. 1, but is slightly offset with respect to a yarn guide groove 41 so as to provide an abutment shoulder 43 for the upper end of the tube 34a which determines the proper seating position of the latter on the arm 33ᵃ.

Straight flat spring elements 44 are fixedly secured in lateral slots 45 of the tube support, or yarn carrier arm 33ᵃ by soldering, welding, or in other suitable manner. The free ends of the spring elements 44 are arranged to extend inwardly beyond the outer periphery of the tube 33ᵃ (see Fig. 17) when the spring elements are in their relaxed or inactive straight line position. During movement of the tube upwardly to its seating position, the spring elements 44 will be slightly bent or curved upwardly (see Fig. 20) so that the lower corners of their free outer ends will slide along the exterior surface of tube 34ᵃ. Longitudinal movement of the tube 34ᵃ downwardly in the releasing direction will, however, be prevented by the endwise pressure connection established by the spring elements. The free ends of the spring elements must consequently be disengaged from contact with the tube, as before, when it is desired to remove the tube from the carrier arm. This will become more apparent by reference to Figs. 20 and 21, the former of which shows the flexible tube 34ᵃ during its upward movement toward seating position attained when its upper end contacts the abutment shoulder 43. During such movement the sharp lower corners of the free tips of the spring elements 44 are in tensioned engagement with the exterior surface of the yarn guide tube 34, but no tube holding pressure is developed by the spring elements during such movement. Both during the upward movement of the tube, and after the tube is properly seated in its determined cooperating position on the carrier, as shown in Fig. 21, the spring elements 44 are set to prevent downward movement of the tube. As in the case of the previously described embodiments of my invention, any slight downward movement of the tube will immediately be resisted by the development of an endwise pressure of the spring elements 44 against the exterior tube surface, which increases in intensity with the tube movement. To release the tube 34ᵃ, for withdrawal from the bore 40, the free ends of the spring elements 44 are moved upwardly, as indicated by their dot-and-dash position in Fig. 21, so that the tips thereof are disengaged from the exterior surface of the yarn guide tube.

Fig. 18 illustrates how the spring element arrangement of Fig. 17 can be simplified. In this instance a single flat angularly shaped spring element 44ᵃ is provided for releasably retaining a plain rigid or flexible yarn guide tube in determined cooperative association with an arm 33ᵇ. The upper end of the vertically extending portion of the spring element 44ᵃ is fixedly secured in a slot 46 arranged longitudinally in the carrier 33ᵇ. An aperture 28 is provided at one side only of the carrier 33ᵇ, and the tube guide bore 40 is arranged substantially the same as in Fig. 2. In this form of construction the resilient horizontally extending portion of the spring element 44ᵃ cooperates with a plain rigid or flexible yarn guide tube in the same manner as the free end of one of the spring elements 44 of the construction shown in Figs. 13 to 17 inclusive.

Each spring element 44 or 44ᵃ is formed of flat spring metal stock of sufficient thickness and the proper resiliency to provide hard tube surface engaging corners at its free tip, and the necessary tension when laterally flexed to bring about the indicated firm endwise pressure connection with the exterior tube surface.

It will be realized that when the spring elements 44 or 44ᵃ are arranged as shown to permit longitudinal movement of the tube in one direction, and prevent such movement thereof in the opposite direction, as in the case of the last two described forms of my invention, such elements perform the function of automatic clutch means while the yarn guide tube is being guided and advanced into its seating position.

It is noted that not all the referred to knitting machine yarn carrier arms are straight throughout their entire length, and that some of them have an offset portion at their lower end. However, since the yarn tube carrying portion of both types of carriers is nevertheless substantially the same, my invention can be readily associated with either type in the manner illustrated in the drawings. Ordinarily, such yarn carrier arms are formed entirely of metal, but due to the present trend toward the use of substitute materials, such as plastics, it may be that these carrier arms will eventually be made of a different material. This may necessitate, or perhaps make it desirable, to secure the spring elements 44 or 44ᵃ to the carrier arm in some other appropriate manner than that shown and described. For example, if the carrier arm is made of a plastic material, the ends of the said spring elements can be fixedly secured thereto by following the well known practice of directly embedding them in the carrier arm during the molding of the latter. Such, and similar changes, are consequently intended to be within the purview of my invention.

It will also be understood that my invention can be readily applied to other devices which are adapted to support small yarn guide tubes of the rigid or flexible type commonly associated with the yarn carriers of full-fashioned knitting machines, such as those described. Furthermore, that the same firm tube gripping action is attained by my invention irrespective whether the exterior tube surface is perfectly smooth, as in the case of a rigid tube of steel, glass, or other material, or is somewhat irregular as in the case of a flexible tube made of spirally wound flat, or round wire, or both. In Fig. 21, the lower corner of the free end of one of the spring elements 44 is shown extending into a recess of the flexible tube surface. When one or more of the spring elements engage the tube in this manner, the thereby established positive locking or latching connection prevents movement of the tube in a downward or releasing direction.

Of course, the novel means by which I accomplish the indicated results, can also be modified and changed in various other ways, without departing from the invention herein disclosed and more particularly defined by the appended claims.

I claim:

1. A device of the character described comprising, a support, a yarn guide tube determinedly positioned on the support, and means for releasably retaining the tube in said position on the support including one or more substantially V-shaped resilient elements.

2. A yarn carrier for a straight knitting machine comprising, a yarn carrier arm, a yarn guide tube determinedly positioned on the arm, and means for releasably retaining the tube in said position on the arm including one or more spring elements connected with the arm adjacent to the side of the tube each of which elements is provided with a substantially straight part having a sharp arcuately shaped portion, the said part being arranged for free lateral flexing movement from an angular position relative to the longitudinal axis of the tube which establishes tensioned engagement of the sharp portion of the part with the exterior surface of the tube, to a tube disengaging position.

3. A device of the character described comprising, a support, a yarn guide tube, and means for maintaining the tube in cooperative association with the support including an element arranged to establish a releasable pressure connection therebetween the pressure of which remains substantially constant when the tube is longitudinally moved relative to the support in one direction and increased by movement of the tube relative to the support in the opposite direction.

4. A device of the character described comprising, a support, a yarn guide tube determinedly positioned on the support, and means for releasably retaining the tube in said position on the support including an element having a substantially straight portion one end of which is associated with the support in such manner that the tip of its other end is freely movable in a lateral direction from angular endwise engagement with the longitudinal exterior surface of the tube to a tube disengaging position.

5. A device of the character described comprising, a support, a yarn guide tube, and means for maintaining the tube in releasable cooperative association with the support including an element having a sharp tube engaging portion, which element is arranged to establish a variable pressure connection between the tube and support the pressure of which is automatically varied by movement of the tube in a certain direction relative to the support.

6. A device of the character described comprising, a support, a yarn guide tube, and means for maintaining the tube in releasable cooperative association with the support including a resilient element having a sharp tube engaging portion, which element is arranged to establish a variable pressure connection between the tube and support the pressure of which is automatically varied by longitudinal movement of the tube in one direction.

7. A yarn carrier for a straight knitting machine comprising, a yarn carrier arm, a yarn guide tube, and means for maintaining the tube in cooperative association with the arm including an element arranged to establish a releasable pressure connection therebetween the pressure of which remains substantially constant during longitudinal movement of the tube relative to the arm in one direction and is increased by movement of the tube relative to the arm in the opposite direction.

8. A device of the character described comprising, a support, a yarn guide tube determinedly positioned on the support, and means for releasably retaining the tube in said position on the support including a substantially straight resilient element one end of which is connected with the support adjacent to the side of the tube and the other end of which is provided with a sharp tube engaging portion arranged for free lateral flexing movement from a diagonally extending tensioned position of engagement with the exterior surface of the tube, to a tube disengaging position.

9. A yarn carrier for a straight knitting machine comprising, a yarn carrier arm, a yarn guide tube determinedly positioned on the arm, and means for releasably retaining the tube in said position on the arm including a flat substantially straight spring element one end of which is connected with the arm adjacent to the side of the tube and the other end of which is provided with a sharp tube engaging portion arranged for free lateral flexing movement from a diagonally extending tensioned position of engagement with the exterior surface of the tube, to a tube disengaging position.

10. A device of the character described comprising, a support, a yarn guide tube, and means for maintaining the tube in releasable cooperative association with the support including one or more elements each provided with slippage preventing tube engaging means, which elements are arranged to establish a variable pressure connection between the tube and support the pressure of which is automatically varied by movement of the tube in a certain direction relative to the support.

11. A device of the character described comprising, a support, a yarn guide tube determinedly positioned on the support, and means for releasably retaining the tube in said position on the support including a substantially V-shaped resilient element the apex portion of which is removably connected with the support adjacent to the side of the tube and the tips of which are arranged for free lateral flexing movement from a diagonally extending tensioned position of engagement with the exterior surface of the tube, to a tube disengaging position.

12. A device of the character described comprising, a support, a yarn guide tube determinedly positioned on the support, and means for releasably retaining the tube in said position on the support including two substantially V-shaped resilient elements each having its apex portion removably connected with the support adjacent opposite sides of the tube and its tips arranged for free lateral flexing movement from a diagonally extending tensioned position of engagement with the exterior surface of the tube, to a tube disengaging position.

13. A yarn carrier for a straight knitting machine comprising, a yarn carrier arm, a yarn guide tube determinedly positioned on the arm, and means for releasably retaining the tube in said position on the arm including a substantially V-shaped resilient element the apex portion of which is removably connected with the support adjacent to the side of the tube and the tips of which are arranged for free lateral flexing movement from a diagonally extending tensioned position of engagement with the exterior surface of the tube, to a tube disengaging position.

14. A yarn carrier for a straight knitting machine comprising, a yarn carrier arm, a yarn guide tube determinedly positioned on the arm, and means for releasably retaining the tube in said position on the arm including two substantially V-shaped resilient elements each having its apex portion removably connected with the support adjacent opposite sides of the tube and its tips arranged for free lateral flexing movement from a diagonally extending tensioned position of engagement with the exterior surface of the tube, to a tube disengaging position.

FRANK G. WEISBECKER.